United States Patent [19]  
Smid et al.

[11] 3,891,628  
[45] June 24, 1975

[54] PROCESS FOR PREPARING PENICILLINS
[75] Inventors: Peter Max Smid, Delft; Jan Kalter, Zevenhuizen, both of Netherlands
[73] Assignee: Koninklijke Nederlandsche Gist-en Spiritusfabriek N.V., Delft, Netherlands
[22] Filed: June 14, 1972
[21] Appl. No.: 262,786

[30] Foreign Application Priority Data
June 15, 1971 United Kingdom............... 28075/71

[52] U.S. Cl........... 260/239.1; 424/271; 260/243 C; 424/246
[51] Int. Cl...................... C07d 99/16; C07d 99/24
[58] Field of Search.................................. 260/239.1

[56] References Cited
UNITED STATES PATENTS
2,996,501  8/1961  Doyle et al. ..................... 260/239.1
3,704,294  11/1972  Kishida et al. ................... 260/239.1

Primary Examiner—Nicholas S. Rizzo
Attorney, Agent, or Firm—Hammond & Littell

[57] ABSTRACT

A new process for the preparation of penicillins and cephalosporins with a heterocyclic side chain, to novel products so obtained and to pharmaceutical compositions containing them, and to a new process for the preparation of penicillin and cephalosporin derivatives useful as intermediates in the aforesaid process.

5 Claims, No Drawings

PROCESS FOR PREPARING PENICILLINS

PRIOR ART

British Pats. Nos. 905,778 and 1,059,303 describe the preparation of therapeutically useful isoxazol-4-yl carbonamidopenicillanic acid compounds of the general formula:

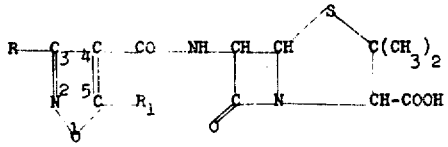   I wherein R and $R_1$ each represent an aryl group optionally substituted by one or more alkyl, alkoxy, alkylsulphonyl or nitro groups or halogen atoms; a heterocyclic nucleus; an alkyl, aralkenyl, aralkyl, cycloalkyl, alkoxy or alkylmercapto group or a halogen atom by reacting 6-aminopenicillanic acid with an acid halide or acid anhydride derived from an isoxazolyl-4-carboxylic acid of the general formula:

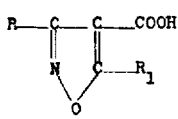   II wherein R and $R_1$ are as hereinbefore defined.

German patent application No. 2,013,908 discloses a modification of the process described in the aforementioned British patents for the preparation of isoxazol-4-ylcarbonamidopenicillanic acid compounds of the general formula:

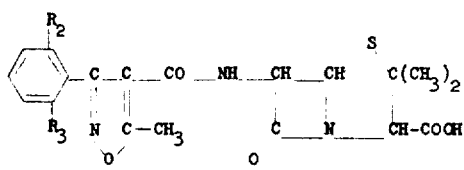   III wherein $R_2$ and $R_3$ each represent a hydrogen or halogen atom and non-toxic salts thereof, said modification comprising using a cycloheptimidazolone derivative of the isoxazolyl-4-caboxylic acid reactant instead of an acid halide or anhydride thereof. The process involves reacting 6-aminopenicillanic acid with a cycloheptimidazolone derivative of an isoxazolyl-4-carboxylic acid of the general formula:

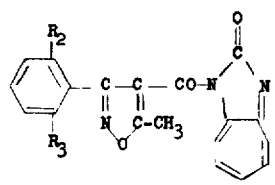   IV wherein $R_2$ and $R_3$ have the same meaning as defined above, which is obtained by the reaction of a compound of the formula:

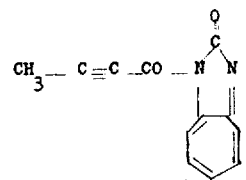   V with a benzonitrile oxide of the formula:

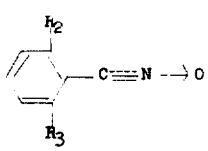   VI wherein $R_2$ and $R_3$ have the same meaning as defined above. Cyclo-additions of acetylene derivatives with nitrile oxides are known from the chemical literature, for example, Synthesis (1970), p 344–360, and Experienta, Vol. 26, (1970), p 1169–1183.

OBJECTS OF THE INVENTION

It is an object of the invention to provide novel penicillins and cephalosporins with a heterocyclic side chain.

It is another object of the invention to provide novel processes for the preparation of penicillins and cephalosporins having a heterocyclic side chain.

It is a further object of the invention to provide novel therapeutic compositions and methods for combatting infections in warm-blooded animals.

These and other objects and advantages of the invention will become apparent as the description thereof proceeds.

DESCRIPTION OF THE INVENTION

The novel process for the preparation of penicillins and cephalosporins of the formula

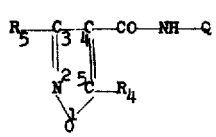 and 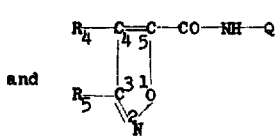

VII                VIII wherein Q is a penicillanic or cephalosporanic acid group of the formula:

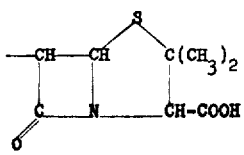

IX

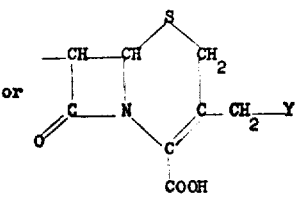

X wherein Y is selected from the group consisting of hydrogen and lower alkanoyloxy, preferably acetoxy, R₄ is selected from the group consisting of hydrogen, lower alkyl, preferably methyl, which may optionally be substituted, phenyl which may optionally be substituted, lower alkoxy, benzyl optionally substituted on the phenyl ring, cycloalkyl of 5 to 8 carbon atoms which may optionally be substituted, or carboxy or esterified carboxy, and R₅ is phenyl optionally carrying one or more substituents selected from the group consisting of lower alkyl, lower alkoxy, di(lower)alkylamino, nitro and halogen, preferably chlorine or fluorine, or R₅ is a tertiary lower alkyl, such as t-butyl, or adamantyl; and the alkali metal, the alkaline earth metal and the amine salts thereof, esters such as (lower)alkylsilyl, benzyl, phenacyl,benzhydryl, acetoxymethyl and 2,2,2-trichloroethyl esters, and imides thereof such as saccharyl, phthalimido or succinimido derivatives, comprises direct formation of the isoxazole ring from compounds of the formula

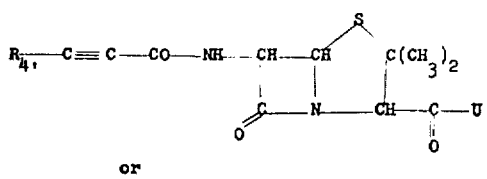 XI or

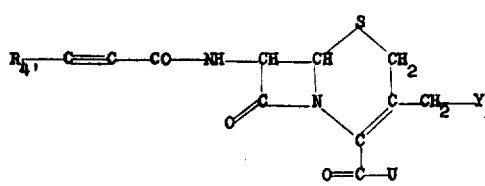 XII wherein Y₁ is selected from the group consisting of hydrogen and lower alkanoyloxy, U is selected from the group consisting of hydroxy, imido such as saccharyl, phthalimido or succinimido, or a group OE in which E is a radical easily removable and replaceable by hydrogen to give a free hydroxy group such as a lower alkylsilyl, optionally substituted benzyl and benzhydryl, 2,2,2-trichloroethyl or optionally substituted phenacyl group, and R₄ has the same meaning as defined above for symbol R₄ except that any group reactive with a nitrile oxide is suitably protected, by reaction with a nitrile oxide of the formula $$R_5-C-N\equiv O \rightarrow XIII$$

wherein R₅ has the same meaning as defined above, in the presence of an organic solvent medium, and optionally converting by methods known per se the group U in the resulting product into a hydroxy group, and removing any protecting group present on the group represented by R₄ in the resulting product. Subsequently a penicillanic or cephalosporanic acid product of general formula VII or VIII may optionally be converted into a salt or ester by methods known per se.

Instead of using the nitrile oxide of formula XIII, a hydroxamoyl halide of the following formula can be used:

 XIV wherein R₅ has the same meaning as defined above, and Hal is a halogen, preferably chlorine, from which the nitrile oxide reactant can be prepared in situ by conducting the reaction in the presence of a suitable base such as a tertiary amine for example, triethylamine.

Substituents which may be present on optionally substituted alkyl, phenyl, benzyl and cycloalkyl within the definition of symbol R₄ of formulae VII and VIII are, for example, hydroxy, lower alkoxy, carboxy, esterified carboxy, such as lower alkoxycarbonyl, and di(lower)alkylamino groups and halogen, preferably chlorine or fluorine.

It will be appreciated that when Q in Formula VII is the penicillanic acid group of formula IX, R₄ is methyl and R₅ is a 2,6-dichlorophenyl, the compound is the well-known penicillin, "Dichloxacillin". The corresponding isomer of formula VIII is hereinafter called "Iso-dicloxacillin".

When a compound of formula XI or XII in which U is hydroxy is used as the reactant with the nitrile oxide of formula XIII, the carboxy group of the penicillanic or cephalosporanic acid can itself react with the nitrile oxide to form undesirable by-products. For some nitrile oxides, this side reaction is relatively slow in comparison with the cyclo-addition (the formation of the isoxazole ring) and consequently, this reaction consumes available nitrile oxide to an undesirable extent only when the cyclo-addition reaction itself is too slow to compete. Moreover, other undesirable by-products can be formed by the dimerization of the nitrile oxide to furoxanes, even when the nitrile oxides are relatively stable. This dimerization with, for example, 2,6-dichlorobenzonitrile oxide (one of the preferred starting materials in the process of the present invention) is very slow but can be accelerated by the presence of acids, for instance by the carboxy group of the penicillanic or cephalosporanic acids. Dimerization of the nitrile oxides therefore becomes of importance in the formation of undesirable by-products only when the cyclo-addition reaction proceeds slowly and when no special precautions are taken to prevent it.

In the reaction of a disubstituted alkynyl compound with a nitrile oxide, it is theoretically possible for two isomeric isoxazoles to be formed. It has been found as a result of research and experimentation that depending upon the conditions utilized one of the two possible cyclo-addition products (isomers) can be obtained in a large excess. When, for example, dichloromethane has been used as solvent for the cyclo-addition reaction of propyn-l-yl penicillin with 2,6-dichlorobenzonitrile oxide, the major cyclo-addition product is 3-(2,6-dichlorophenyl)-4-methyl-5-isoxazolyl-penicillin (isodicloxacillin) and the same trend was found when solvents such as benzonitrile or phenylacetonitrile were used, although in these cases the reaction proceeded at a slower rate, and the previously mentioned side reactions were more pronounced.

On the other hand by using aprotic dipolar organic solvents like tetrahydrofuran, ethyl acetate, dioxane, 1,2-dimethoxyethane, diglyme, dimethylformamide or hexamethyl phosphontriamide, the other cyclo-addition isomer, namely 3-(2,6-dichlorophenyl)-5-methyl-4-isoxazolyl-penicillin(or dicloxacillin) becomes the principal product and its conversion ratio increases as the electron-donating power of the solvent increases and side reactions are negligible. However, a complication in the use of these solvents and especially the last three solvents, is that, although the conditions for good yields are extremely favorable, the reaction rate is relatively very slow. Therefore, the best reaction media for the preparation of dicloxacillin, as opposed to iso-dicloxacillin, are solvents having an aprotic dipolar nature such as tetrahydrofuran and ethyl acetate to which suitable quantities, such as about 20%, of hexamethylphosphontriamide have been added, and in which the cyclo-addition reaction can be effected relatively rapidly at moderately elevated temperatures. For instance, by employing such solvent mixtures it is possible to obtain dicloxacillin in high yields within about 7 hours operating at about 65°C., without using a large excess of 2,6-dichlorobenzonitrile oxide. Under such conditions, none of the possible by-products caused by the aforementioned side reactions may be formed and pure dicloxacillin, e.g. in the form of its sodium salt, can be separated from the reaction mixture without difficulty. For the formation of other 4-isoxazolyl-penicillins and -cephalosporins by the process of the invention, the preferred reaction media solvents are the same as those indicated above for the formation of dicloxacillin using propyn-l-ylpenicillin and 2,6-dichlorobenzonitrile oxide as reactants.

Another method to eliminate the nitrile oxide consuming side reaction with the carboxy radical of alkynyl-penicillanic and -cephalosporanic acids of formulae XI and XII respectively (U = OH), is the employment of esters and imides of the said acids. Preferred esters are those which can be easily prepared and from which the esterifying radical can be readily removed after the reaction, advantageously by a simple procedure such as hydrolysis, to yield the free penicillanic or cephalosporanic acid. Suitable esters are the optionally substituted phenacyl ester, benzyl, benzhydryl, 2,2,2-trichloroethylester and (lower)alkylsilyl esters, preferably the trimethylsilyl ester. When esters are used, a shift in the cyclo-addition pattern then occurs and this can avoid the necessity of determining the right solvent media to obtain the preferred 4-isoxazolyl-penicillins or -cephalosporins, such as dicloxacillin. For example, the cyclo-addition reaction between 2,6-dichlorobenzonitrile oxide and the phenacyl ester of propyn-l-ylpenicillin in dichloromethane gives a relatively large amount of dicloxacillin phenacyl ester, and when tetrahydrofuran is employed as solvent the addition of a co-solvent such as hexamethylphosphontriamide is almost unnecessary to suppress the formation of iso-dicloxacillin phenacyl ester.

The process of the invention is preferably applied to the production of compounds of formulae VII and VIII in which $R_4$ is a hydrogen or methyl, ethyl, propyl, phenyl, benzyl or cyclohexyl group, or a methyl or ethyl group substituted with a hydroxy, methoxy or ethoxy, or is a carboxy or a methoxy or ethoxy group, and $R_5$ is phenyl, 2,6-dichlorophenyl, 2,6-difluorophenyl, 2-chloro-phenyl, 2-chloro-6-fluoro-phenyl, 2,6-dimethylphenyl or 2,4,6-trimethylphenyl, and more especially those compounds of formula VII in which Q is a penicillanic acid group of formula IX. Important products are 6-[3-(2,6-dichlorophenyl)-5-methyl-isoxazol-4-yl-carbonamido]penicillanic acid (dicloxacillin), 6-[3-(2,6-dichlorophenyl)-5-hydroxy-methyl-isoxazol-4-yl-carbonamido]penicillanic acid, 6-[3-(2,6-dichlorophenyl-5-ethoxy-isoxazol-4-yl-carbonamido]penicillanic acid and 6-[3-(2-chloro,6-fluorophenyl)-5-methyl-isoxazol-4-yl-carbonamido]-penicillanic acid (flucloxacillin), (the first and last of which are known medically administered penicillins), and non-toxic, pharmaceutically acceptable salts and esters thereof.

The cyclo-addition process of the present invention involves the use as starting materials of alkynyl-1-penicillins and -cephalosporins of formulae XI and XII. Some alkynyl-1-penicillins have previously been disclosed in the specification of Belgian Pat. No. 593,222. In that patent specification there is described the preparation of ethyn-1-yl, propyn-1-yl, heptyn-1-yl and 2-phenylethyn-1-yl derivatives of 6-aminopenicillanic acid and salts thereof by the reaction of the corresponding alkynoic acid, or an anhydride or acid halide thereof, with 6-aminopenicillanic acid in the optional presence of a carbodiimide. However, the alkynoic acids required for the acylation step are expensive and are difficult to obtain commercially, and in many cases it is difficult to prepare pure and stable solutions of the alkynoic acid chlorides, e.g., 2-butynoic acid chloride cannot be distilled without considerable decomposition.

It has now been found that alkyn-l-yl-penicillins and -cephalosporins can be prepared in very high yields by a new process which avoids the use of expensive alkynoic acid reactants, such as halides or anhydrides thereof as described in the Belgian Pat. No. 593,222. This new and advantageous process of the present invention involves reacting a 6-isocyanatopenicillanic acid derivative or 7-isocyanatocephalosporanic acid derivative of the formulae

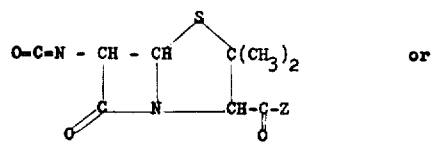

or

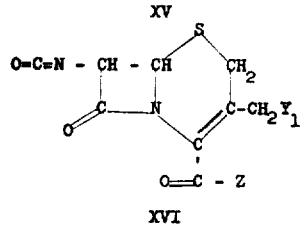

(wherein Z has the same meaning as U, as previously defined, with the exclusion of a hydroxy group or an optionally substituted phenacyl group, or an 2,2,2-trichloroethyl group and $Y_1$ has the same meaning as previously defined) with an organometallic alkynyl compound of the formula $$R_4{''} -C\equiv C - X$$

XVII wherein X is a metal atom $Me^I$ or a group $Me^{II}$—Hal, Me representing a metal atom and the roman numeral is it valency, and Hal represents iodine or, preferably, bromine or chlorine, and $R_4{''}$ has the same meaning as does $R_4$ as previously defined or represents a group with the definition of that symbol with any hydroxy or carboxy radical present suitably protected by a group which can easily be removed after the reaction, and treating the resulting organo-metal product so obtained in manner known per se to remove the metal atom $Me^I$ or the grouping $Me^{II}$—Hal, and also, if desired, any group present protecting a hydroxy or carboxy group, optionally followed by transforming the obtained acid into a salt. The metal present in the alkynyl reagent of formula XVII may be lithium, magnesium, sodium, or potassium, with magnesium being preferred.

The reaction is carried out in an organic solvent medium, for example, tetrahydrofuran to which hexamethylphosphontriamide and/or toluene may have been added, preferably at a low temperature, such as −40° to −70°C. Yields of alkyn-1-yl-penicillins and -cephalosporins of formulae XI and XII as high as 90% of the theoretical can be obtained by this new process.

It will be appreciated that after obtention by the aforesaid new process of starting materials of formulae XI and XII wherein U is a hydroxy group, the penicillanic or cephalosporanic acid compound may be esterified by methods known per se to introduce an appropriate ester radical, e.g. a phenacyl or alkylsilyl group.

The combination of the two aforedescribed processes for the preparation of alkyn-1-yl -penicillins and -cephalosporins of formulae XI and XII and the preparation of isoxazolyl-penicillins and isoxazolyl-cephalosporins therefrom by the formation of the isoxazole ring by reaction with a nitrile oxide is a particularly important feature of the present invention.

The isocyanato starting materials of formulae XV and XVI can be obtained by reacting phosgene with 6-aminopenicillanic or 7-aminocephalosporanic acid derivatives of the general formula

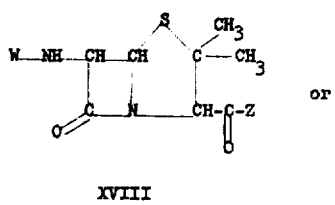

XVIII or

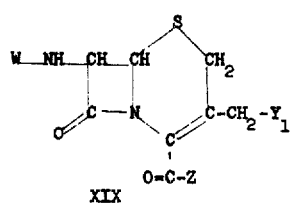

XIX wherein Z and $Y_1$ have the same meaning as previously defined and W is hydrogen or a group such that the grouping W-NH- is easily convertible to an isocyanato group by reaction with phosgene in an inert anhydrous organic solvent medium to convert the amino or substituted amino group into the isocyanato radical without affecting the bicyclic nucleus. As organic solvents, toluene and dichloromethane, or mixtures thereof, are preferred. To facilitate the reaction, an organic base can be added to the reaction mixture as an acid-binding agent for the hydrogen chloride formed; tertiary amines such as triethylamine and N-ethylpiperidine are advantageously used for this purpose. The reaction of the compounds of formulae XVIII and XIX with phosgene must be carried out at very low temperatures; temperatures at or below −20°C., and preferably −40°C., are used with advantage. Destruction of the bicyclic nucleus is thereby prevented.

The organo-metal alkynyl starting materials of formula XVII can be prepared by methods known per se, for example by reacting an acetylenic compound $R_4{''} -C\equiv CH$ (wherein $R_4{''}$ has the same meaning as previously defined) with ethyl magnesium bromide in an organic medium, e.g. tetrahydrofuran-hexamethylphosphontriamide, at ambient or slightly elevated temperature.

The invention also includes within its scope new compounds within the scope of formulae VII and VIII. Such new compounds include the penicillins and cephalosporins of formula VIII wherein the isoxazolyl radical is attached to the carbonamido grouping through the 5-position of the isoxazolyl ring, e.g. 6-[3-(2,6-dichlorophenyl)-4-methylisoxazol-5-yl-carbonamido]-penicillanic acid, and salts, esters and amides thereof, and also compounds of formula VII in which, for example, $R_4$ is selected from the group consisting of lower alkyl, phenyl, benzyl and cycloalkyl group substituted by at least one member of the group lower alkoxy, carboxy, esterified carboxy, di(lower)alkylamino and halogen, or $R_4$ is a carboxy or esterified carboxy group. Other new compounds of the invention are 6-[3-(2,4,6-trimethylphenyl) -5-methylisoxazol-4-yl-carbonamido]-penicillinic acid and salts, esters and imides thereof.

The novel penicillanic and cephalosporanic acid derivatives of formulae VII and VIII have antibacterial properties against gram positive and gram negative microorganisms which make them useful as medicines for man and animals and as additives in animal feed. They are preferably employed for therapeutic purposes, when appropriate, in the form of a non-toxic, pharmaceutically acceptable salt such as sodium, potassium or calcium salts. Other salts that may be used in pharmaceutical preparations include the non-toxic, suitably crystalline salts with organic bases, such as amines, procaine and dibenzylamine. When used for therapeutic purposes the compounds of formulae VII or VIII may be used as such or in the form of a pharmaceutical preparation customarily employed for the administration of therapeutically active substances, especially antibiotics.

The invention includes within its scope pharmaceutical preparations comprising, as the active ingredient, one of the novel penicillanic or cephalosporanic acid derivatives of formulae VII and VIII in association with a pharmaceutically acceptable carrier. The preferred types of pharmaceutical preparations are those suitable for oral administration and especially capsules. Such capsules are preferably made of absorbable material such as gelatin, and may contain the active substance alone or in admixture with a solid or liquid diluent. They may also contain the active substance attached to, or incorporated in, a carrier substance in such a way that the active substance is released over an extended period of time after ingestion. Liquid preparations may be in the form of solutions suitable for parenteral administration.

The novel method of combatting bacterial infections in warm-blooded animals comprises administering an effective amount of a penicillin or cephalosporin having formula VII or VIII. The compounds may be administered orally, parenterally or rectally. The usual daily dose is 5 to 100mg/kg, depending upon the method of administration and the specific compound. The compounds have been shown to be effective against gram negative and positive bacteria, such as Bacillus subtilis, Streptococcus haemolyticus, Staphylococcus aureus, Diplococcus pneumoniae, Brucella melitensis and Pasteurella multocida.

In the following examples there are described several preferred embodiments to illustrate the invention. However, it should be understood that the invention is not intended to be limited to the specific embodiments.

EXAMPLE I

PREPARATION OF 6-[(PROPYN-1-YL)CARBONAMIDO]-PENICILLANIC ACID 440 mg of magnesium turnings and 16 ml of dry tetrahydrofuran (THF) were introduced into a 100 ml, four-necked, glass vessel equipped with a mechanical stirrer, a thermometer, a gas inlet tube through which dry nitrogen was introduced continuously and a pressure equilibrated dropping funnel, on the top of which was placed a gas outlet tube sealed with phosphorus pentoxide. A solution of 1.2 ml (about 16 mmol) of bromoethane in 10ml was then tetrahydrofuran was added dropwise into the vessel. The reaction temperature during the addition was maintained between 25° and 30°C. by external cooling. After the addition, the reaction mixture was stirred for 30 minutes at 30°–35°C. The reaction mixture was then cooled to 15°C and after 8 ml of hexamethylphosphontriamide (HMPA) were added, the temperature of the mixture was brought to 20°C. Next, gaseous propyne, (i.e. methyl acetylene) was slowly introduced below the surface of the stirred mixture causing the temperature to rise to about 30°C. Propyne was bubbled through the reaction mixture for 60 minutes, after which the reaction mixture now containing an excess of the Grignard reagent derived from propyne was cooled to −70°C. A solution of 3.28 g (10.43 mmol) of the trimethylsilyl ester of 6-isocyanatopenicillanic acid in 25 ml of dry toluene was then added during 15 minutes, the rate of addition being adjusted to keep the temperature just below −45°C.

The reaction mixture was subsequently stirred for 15 minutes at −45°C and then poured slowly into a mixture of 50 ml of iced water and 50 ml ethyl acetate, sufficient 4N hydrochloric acid being added simultaneously to maintain a pH of 3.0. The pH of the mixture was then raised to 7.0 with 1N sodium hydroxide. The layers of the resulting mixture were separated and inspected by thin-layer chromatography on silica (98:2 mixture of diethyl ether and formic acid, sulphur detection by iodine azide and starch sprays). The water layer gave a one spot chromatogram and the organic layer was found still to contain a small amount of the propynyl-penicillin product. The organic layer was therefore twice extracted with 5 ml of iced water. The water layers wer combined and acidified to a pH of 3.0 with 4N hydrochloric acid. This solution was extracted with three successive portions of 50, 30 and 20 ml. of ethyl acetate, respectively. These extracts wer combined, twice washed with a small volume of iced water, dried over anhydrous magnesium sulfate, filtered and evaporated to dryness in vacuo. After several hours drying in vacuo in a desiccator, the final product weighed 2.8 g. (theory 2.82 g) and had a single spot thin-layer chromatogram. The structure of the penicillin was confirmed by its IR and PMR spectra. Several identical runs produced from 2.5 to 2.8 g of product. The products contained only small variable amounts of ethyl acetate indicating a standard isolation yield of approximately 90%.

The compound was converted into its crystalline cyclohexylamine salt as follows:

2.7 g of the above propyn-1-yl-penicillanic acid were dissolved in 75 ml of diethyl ether and then 0.75 ml of cyclohexylamine were added to this solution causing precipitation of a crystalline product, which was separated by filtration, washed with cold diethyl ether and dried in vacuo at room temperature until the weight of the product remained constant. The yield was 2.7 g and the product had a one spot thin-layer chromatogram. According to a PMR spectrum, the product contained about 0.5 mol of diethyl ether. The product was therefore heated for 5 hours at 40°C in vacuo. According to a PMR spectrum, the crystalline product of this heating had lost the diethyl ether, but had taken up 0.5 mol of water.

Calculated for $C_{18}H_{27}N_3SO_4 \cdot \frac{1}{2}H_2O$:
C, 55.43%; H, 7.25%; N, 10.77%; S, 8.22%; O, 18.33%.

Found:
C, 55.67% (55.74 and 55.6); H, 7.26% (7.29 and 7.23); N, 10.72% (10.65 and 10.78); S, 8.15% (8.11 and 8.19); O, 18.20%.

Analysis of the proton magnetic resonance spectrum of the solution of the cyclohexylamine salt of 6-[(propyn-1-yl) carbonamido]-penicillanic acid, ½ diethylether in hexadeuterodimethylsulfoxide (60Mc,δ - values in ppm, internal reference 2,2-dimethyl-silapentane-5-sulfonate):

| | | |
|---|---|---|
| $CH_3$ diethyl ether | 1.08 (center of triplet) | } about 22 protons |
| $C_3$—$CH_3$ | 1.47 and 1.58 (sharp signals) | |
| ≡ C—$CH_3$ | 1.98 (sharp) | |
| $(CH_2)_5$ cyclohexyl | about 0.8 → 2.2 | |
| N—CH cyclohexyl | 2.7 → 3.1 | (about 1 proton) |
| $CH_2$ diethyl ether | 3.46 | (centre of quartet, 2 protons) |
| $C_2$—H | 3.93 | (sharp 1 proton) |
| $C_5$—H and $C_6$—H | 5.37 | (slightly broadened singlet, 2 protons) |
| N—H, $NH_3$ and possibly $H_2O$ | about 6.3 → 9.5 | (low broad absorption area, at least 4 protons) |

Partial analysis of the IR spectrum of a solution of 6-[(propyn-1-yl)-carbonamido]-penicillanic acid, cyclohexylamine salt in chloroform (values in cm$^{-1}$):

| | |
|---|---|
| 3420 | NH |
| about 3100 | N$^+$H$_3$ |
| 2942 | CH$_2$ cyclohexyl |
| 2867 | |
| 2240 | C≡C |
| 1775 | C=O $\beta$-lactam |
| 1658 | C=O amide |
| ±1590 | C=O carboxylate ion + possibly NH def. |
| 1495 | possibly N$^+$H$_3$ def. |

In a similar manner employing gaseous 1-butyne instead of propyne, 6-[(butyn-1-yl) carbonamido]-penicillanic acid was prepared and 6-[(phenyl-ethynyl) carbonamido]-penicillanic acid was also prepared employing bromoethane, phenylacetylene and 6-isocyanatopenicillanic acid trimethylsilyl ester in 3.2 : 3.3 : 2.1 molar proportions. In both instances the conversions were again practically quantitative, resulting in about 90% insolation yields.

EXAMPLE II

PREPARATION OF 6-[3-(2,6-DICHLOROPHENYL)-4-METHYLISOXAZOL-5-YL-CARBONAMIDO]-PENCILLANIC ACID

To a solution of 2.7 g of 6-[(propyn-1-yl) carbonamido]-penicillanic acid (9.5 mmol) in 25 ml of dry dichloromethane in a glass vessel were added 1.8 g (9.58 mmol) of pure 2,6-dichlorobenzonitrile oxide. The glass vessel was then sealed and left to stand at room temperature for 19 hours. Subsequent analysis of the reaction mixture using thin-layer chromatography indicated that about 75% of the propynyl-penicillanic acid starting material had been converted to the desired product. Also present in the reaction mixture was dicloxacillin (at most 5%), products formed by the addition of the nitrile oxide to the carboxyl group in the propynyl penicillin starting material and the desired penicillin product (together about 10%), and about 10% of unreacted propynyl starting material.

The dichloromethane was distilled off from the reaction mixture and the residue was dissolved in 50 ml of ethyl acetate and thoroughly mixed with 75 ml of iced water at pH 7.5. After separation of the layers of the resulting mixture, the ethyl acetate layer which contained "esterified" penicillanic acids, traces of 3,4-di(2,6-dichlorophenyl)furoxane and a small quantity of the desired penicillanic acid was discarded. The water layer was extracted 4 times with 50 ml. of ethyl acetate at pH's of 6.5, 5.0 and 4.0 respectively. According to thin-layer chromatography, the extracts of pH 6.5 and pH 6.0 contained only the desired penicillanic acid. The extracts of pH 6.5, 6.0 and 5.0 were combined, washed with iced water, dried over anhydrous magnesium sulfate, filtered and finally evaporated in vacuo to obtain 1.8 g of a white amorphous solid. According to the PMR spectrum, the purity of the final product was about 85%. The impurities were mainly ethyl acetate and some diethyl ether. The final product did not contain dicloxacillin, but did contain a relatively very small amount of the propynyl penicillanic acid starting material.

Analysis of the PMR spectrum of 6-[3-(2,6-dichlorophenyl)-4-methyl-isoxazol-5-yl-carbonamido]-penicillanic acid dissolved in CDCl$_3$ (60 Mc, $\delta$ - values in ppm, internal reference tetramethylsilane):

| | | |
|---|---|---|
| C$_2$—CH$_3$ | 1.69 | (two almost coinciding signals, 6 protons) |
| —CH$_3$ (isoxazole) | 1.99 | (3 protons) |
| C$_2$—H | 4.54 | (1 proton) |
| C$_3$—H and C$_6$—H | 5.3 → 5.8 | (multiplet, 2 protons) |
| N—H | about 6.55 and 6.7 | (doublet, about 1 proton) |
| C$_6$H$_3$ and COOH | about 7.25 | (about 4 protons) |

Partial analysis of the IR-spectrum of 6-[3-(2,6-dichlorophenyl)-4-methylisoxazol-5-yl-carbonamido]-penicillanic acid dissolved in chloroform (values in cm$^{-1}$):

| | |
|---|---|
| 3420 | NH |
| 1790 | C=O $\beta$-lactam |
| 1720 | C=O carboxyl |
| 1655 | C=O amide |
| 1600 | presumably aromatic C=C in plane vibrations |
| 1493 | |
| 1578 | presumably C=C and C=N vibration of the isoxazole ring |
| 1562 | |
| 1430 | absorption typical for the isoxazole ring |

EXAMPLE III

PREPARATION OF PHENACYL 6-[(BUTYN-1-YL)CARBONAMIDO]-PENICILLANATE

6-[(Butyn-1-yl)carbonamido]-penicillanic acid was prepared as described in Example I using 880 mg of magnesium turnings in 40 ml of tetrahydrofuran and 2.4 ml of bromoethane in 10 ml of tetrahydrofuran and then adding 16 ml. of hexamethylphosphontriamide (HMPA). Gaseous 1-butyne from a cylinder was then slowly introduced below the surface of the stirred mixture. After cooling of the reaction mixture to −70°C., a solution of 6.56 g of trimethylsilyl 6-isocyanatopenicillanate in 40 ml of dry toluene was added dropwise at −70°C. After a short reaction time, the reaction mixture was poured into a mixture of 200 ml of iced water and 100 ml of ethyl acetate while the pH was maintained at about 3.0. The pH of the resulting mixture was adjusted to 7.0. After separation of the two layers of this mixture, the organic layer was washed twice with 10 ml of water. The combined water layers were extracted at pH 3.0 once with 100 ml and twice with 50 ml of ethyl acetate. The ethyl acetate extracts were washed three times with a little water and 1.76 g of sodium bicarbonate were added to the ethyl acetate layer. The water layer was separated and the organic layer was extracted twice with 25 ml of water. 40 ml of acetone were added to the combined water layers and then 4.26 g of phenacylbromide in 40 ml of acetone were added dropwise at ±5°C. The reaction mixture was kept overnight at room temperature. According to thin layer chromatography (98.2 mixture of diethyl ether and formic acid), the starting material had not been completely consumed. The acetone was distilled off now by a rotating evaporator. The residue was extracted 3 times with 50 ml of diethyl ether. The diethyl ether extracts were washed 3 times with 25 ml of water and then dried over anhydrous magnesium sulfate. After treatment of the resulting liquid with activated charcoal, the ether was removed by distillation to leave an oily residue, which did not solidify. The residue was put on a silica column and subsequently eluted with a benzenepetroleum ether mixture (4:6), benzene and a benzene diethyl ether mixture (9:1). The fractions containing the desired compound were collected and evaporated to dryness to give 3.4 g of an oil residue which did not crystallize. The structure of the desired compound was confirmed by its IR and PMR spectra.

Analysis of the PMR spectrum in $CDCl_3$ (60 Mc,$\delta$ - values in ppm, internal reference tetramethylsilane).

| | | |
|---|---|---|
| $CH_3$ (ethyl group) | 1.17 (centre of triplet) | 3 protons |
| $C_3$—$CH_3$ | 1.68 and 1.73 | 6 protons |
| $CH_2$ (ethyl group) | 2.30 (centre of quartet) | 2 protons |
| $C_2$—H | 4.55 | 1 proton |
| $Ch_2$—O | 5.10, 5.38, 5.43 and 5.65 (quartet) $J_{AB}\approx$ 17 cps | 4 protons |
| $C_5$—H and $C_6$—H | 5.48 → 5.78 (multiplet) | |
| NH | 6.58 and 6.73 (doublet) $J_{AB}\approx 8.5$ cps | 1 proton |
| $C_6H_5$ | 7.30 → 7.93 | |

Partial analysis of the IR-spectrum of phenacyl 6-[(butyn-1-yl)carbonamido]-penicillanate (KBr disc, values in $cm^{-1}$)

| | |
|---|---|
| 3320 | NH |
| 2260 | C≡C |
| 1790 | C=O $\beta$-lactam |
| 1760 | C=O ester |
| 1710 | C=O ketone |
| 1660 | C=O amide |
| 1600 | C=C aromatic in plane vibrations. |

EXAMPLE IV

PREPARATION OF PHENACYL 6-[3-(2,6-DICHLOROPHENYL)-5-ETHYLISOXAZOL-4-YL-CARBONAMIDO]-PENICILLANATE a. 100 mg of phenacyl 6-[(butyn-1-yl)carbonamido]-penicillanate, as prepared in Example III, and 50 mg of 2,6-dichlorobenzonitrile oxide (DBNO) were dissolved in 1 ml of dichloromethane. After stirring for 19 hours at room temperature, the presence of DBNO in the reaction mixture could be demonstrated by thin layer chromatography (TLC) (1:1 mixture of benzene and petroleum ether). According to TLC using a mixture of benzene and diethyl ether (2:1 + 2% formic acid), two new compounds having higher Rf values were formed, the concentration of the component having the highest Rf value being low. After the reaction mixture had been held for 80 hours at room temperature, the starting material had been completely consumed.

b. When the reaction is carried out in ethyl acetate, after 19 hours the TLC was as described above. However after 80 hours, a small amount of starting penicillanate and some DBNO were still present. After continuation of the reaction, some crystalline material had formed. The supernatant liquid was separated off and the collected crystals were washed with ethyl acetate. According to TLC, the isolated product represented the spot with the lower Rf-value previously found and was the desired compound according to IR and PMR spectra.

c. When the reaction was carried out in hexamethylphosphontriamide (HMPA), the reaction rate appeared to be slower than in either dichloromethane or ethyl acetate. However the compound having the higher Rf-value appeared to be formed in a smaller amount.

d. The reaction was also performed in tetrahydrofuran (THF) but at reflux temperature. After one hour the 1-butynyl-penicillanate starting material had been converted for the greater part to the same two compounds as formed in the foregoing reactions. The DBNO was partly converted into furoxane. After refluxing for 2 hours, a further 25 mg of DBNO was added. After 4 hours, only a trace of the 1-butynylpenicillanate starting material was present. 2.8 g of the 1-butynylpenicillin phenacyl ester were dissolved in 28 ml of THF and 700 mg of DBNO were then added. After refluxing for 1 to 2 hours, another 700 mg of DBNO were added. After 4 hours, only a trace of 1-butynylpenicillanate could be detected. After removal of the solvent by vacuum distillation, the residue was put on a silica column (diameter = 3.4 cm, length = 50 cm) and eluted, with external water cooling, with mixtures of benzene and petroleum ether in the proportions 4:6 (1000 ml), 3:1 (500 ml) and 9:1 (500 ml), benzene (500 ml), and a benzenediethyl ether mixture in the proportions 95:5 (2000 ml). The collected fractions, containing the desired compound, were evaporated to dryness, to obtain 1.6 g of a white solid. The IR and PMR spectra indicated the desired compound.

Partial analysis of the IR spectrum of phenacyl 6-[3-(2,6-dichlorophenyl)-5-ethylisoxazol-4-yl-carbonamido]-penicillanate (KBr disc, values in $cm^{-1}$).

| | |
|---|---|
| 3400 | NH |
| 1790 | C=O $\beta$-lactam |
| 1755 | C=O ester |
| 1700 | C=O ketone |
| 1680 | C=O amide |
| 1600 | C=C aromatic in plane vibrations |
| 1585 } | presumably C=C and C=N vibrations of |
| 1560 } | the isoxazole ring |
| 1435 | typical absorption for the isoxazole ring |
| 785 | C—Cl |

Analysis of the PMR spectrum of phenacyl 6-[3-(2,6-dichlorophenyl-5-ethylisoxazol-4-carbonamido]-penicillanate dissolved in $CDCl_3$ (60 Mc,$\delta$ - values in ppm, internal references tetramethylsilane):

| | |
|---|---|
| $CH_3$ (ethyl group) | 1.42 (centre of triplet) |
| $C_3$—$CH_3$ | 1.53 and 1.63 |
| $CH_2$ (ethyl group) | 3.25 (centre of quartet) |
| $C_2$—H | 4.45 |
| $CH_2$—O | 5.10; 5.38; 5.42; and 5.68 (quartet, $J_{AB}\approx 16.5$ cps) |
| $C_5$—H | 5.42 and 5.50 (doublet, J≈4 cps) |
| $C_6$—H | 5.62; 5.63; 5.77 and 5.83 (quartet, J≈4 cps, J'≈9 cps) |
| NH | 5.92 and 6.07 (doublet J'≈9 cps) |
| $C_6H_5 + C_6H_3$ | 7.45 → 7.93 |

EXAMPLE V

PREPARATION OF PHENACYL 6-[(PROPYN-1-YL)CARBONAMIDO]-PENICILLANATE

As described in Example I, a mixture of 880 mg of magnesium turnings, 40 ml of tetrahydrofuran (THF) and 2,4 ml of bromethane was obtained. The dropping funnel was cleared with a further 10 ml of THF. After the resulting mixture had been cooled with ice, 16 ml of hexamethylphosphontriamide were added, and propyne was then slowly introduced. After the reaction, 6.56 g of trimethylsilyl 6-isocyanatopenicillanate dissolved in 40 ml of dry toluene were added dropwise at a temperature of −70°C. The formed porduct was isolated by pouring into an iced water/ethyl acetate mixture as described before.

To obtain the 1-propynylpenicillanic acid, the water layer was extracted with 100 ml of ethyl acetate and 50 ml of ethyl acetate at pH 3.0 and then twice with 50 ml of ethyl acetate at pH 2.5. The ethyl acetate layers were washed with water and a solution of 1.76 g of sodium bicarbonate in 30 ml of water was then added. The ethyl acetate layer was extracted twice again with 25 ml of water. To the combined water layers were added 40 ml of acetone and, with ice cooling, 4.3 g of phenacyl bromide dissolved in 40 ml of acetone were introduced dropwise. The reaction mixture was then allowed to stand at room temperature. After 85 hours, the acetone was removed by vacuum distillation. The remaining liquid was extracted twice with 50 ml of ethyl acetate. The combined ethyl acetate layers were washed three times with water and then dried over anhydrous magnesium sulfate. After removal of the organic solvents, 7.7 g of an oil remained. The infrared spectrum of the product so obtained was consistant with the structure named above.

EXAMPLE VI

PREPARATION OF PHENACYL 6-[3-(2,6-DICHLOROPHENYL)-5-METHYLISOXAZOL-4-YL-CARBONAMIDO]-PENICILLANATE (i.e. DICLOXACILLINPHENACYL ESTER)

7.50 g of phenacyl 6-[(propyn-1-yl)carbonamido]-penicillanate, prepared as in Example V, were dissolved in 50 ml of tetrahydrofuran and to this solution was added 3.5 g of 2,6-dichlorobenzonitrile oxide (DBNO). The mixture was refluxed and after one hour a further 1.75 g of DBNO were introduced. After 4 hours of refluxing, only a trace of the 1-propynyl ester starting material remained. 1 ml of this reaction mixture was evaporated to dryness for analysis by PMR spectroscopy. From this spectrum, the ratio of the two compounds, dicloxacillin phenacyl ester and iso-dicloxacillin phenacyl ester in the product, appeared to be 4:1.

The remainder of the reaction mixture was evaporated to dryness and the residue was placed on a silica column (length = 80 cm, diameter = 3.4 cm) and eluted with benzene +2% diethyl ether with external cooling. The fractions containing the desired compound were combined and evaporated to dryness giving a residue of 3.0 g. The structure of the desired compound was confirmed by PMR and IR spectra.

Analysis of the PMR spectrum (60 Mc, δ-values in ppm, solution in $CDCl_3$).

| | |
|---|---|
| $C_3$—$CH_3$ | 1.50 and 1.60 |
| $CH_3$ (isoxazole) | 2.75 |
| $C_2$—H | 4.45 |
| $CH_2$—O | 5.07; 5.35; 5.38; 5.65; (quartet, J=17.5) |
| $C_5$—H | 5.38 and 5.47 (J≈4 cps) |
| $C_6$—H | 5.58; 5.65; 5.73; 5.80 (quartet $J_{C_6-H,NH}$≈4 cps $J_{NH,C_6-H}$≈4 cps) |
| NH | 5.90 and 6.05 (doublet $J_{NH,C_6-H}$≈9 cps) |
| $C_6H_5$ + $C_6H_3$ | 7.3 → 7.9 |

Partial analysis of the IR-spectrum (KBr disc, values in $cm^{-1}$).

| | |
|---|---|
| 3455 | NH |
| 1790 | C=O β-lactam |
| 1750 | C=O ester |
| 1705 | C=O ketone |
| 1675 | C=O amide |
| 1600 | C=C aromatic |
| 1435 | absorptions typical for the |
| 1375 | isoxazole ring. |
| 790 | C—Cl |
| 775 | |

EXAMPLE VII

PREPARATION OF SODIUM 6-[3-(2,6-DICHLOROPHENYL)-5-METHYLISOXAZOL-4-YL-CARBONAMIDO]-PENICILLANATE (SODIUM DICLOXACILLIN)

6-[(Propyn-1-yl)carbonamido]-penicillanic acid was prepared as in Example I using 1.64 g of trimethylsilyl 6-isocyanatopenicillanate (5.2 mmol). After working up, the ethyl acetate solution was concentrated to a volume of 20 ml and 5 ml of hexamethylphosphontriamide were added, followed by 500 mg of 2,6-dichlorobenzonitrile oxide (DBNO). The reaction mixture was heated to 60°C using a thermostatically controlled water bath. After 1 hour and after 3 hours of heating, respectively, further 500 mg quantities of DBNO were added. Thin layer chromatography showed that, after eight hours, the 1-propynyl-penicillanic acid starting material had practically disappeared and mainly dicloxacillin and a little isodicloxacillin had been formed. After the reaction mixture was cooled to room temperature, iced water and ethyl acetate were added and the layers of the resulting mixture were separated after the pH had been adjusted to 7.5.

The water layer was extracted 3 times at pH 4.5 using 50 ml of diethyl ether each time. The combined layers were then washed with iced water and dried over anhydrous magnesium sulfate and contained according to TLC dicloxacillin and a trace of iso-dicloxacillin. After removal of the organic solvent, 1.95 g of a white solid remained which consisted according to PMR of 80% dicloxacillin, 10% iso-dicloxacillin and 10% of the 1-propynyl-penicillanic acid starting material. The solid was dissolved in 15 ml of acetone and then 4 ml of sodium 2-ethylhexanoate solution in ethyl acetate (conc. 1 mmol/ml) followed by 0.15 ml of water was added. 6 ml of low boiling petroleum ether were added dropwise to the mixture with stirring and the sodium salt of dicloxacillin crystallized on cooling. The product was filtered off and dried in vacuo to constant weight to obtain 1.13 g of the product (2.4 mmol; yield of 46%).

The product was identical to that prepared via the conventional route of coupling 3-(2,6-dichlorophenyl)-5-methylisoxazole-4-carbonyl chloride with 6-aminopenicillanic acid.

Analysis of the PMR spectrum in $D_2O$ and a little DMSO (60 Mc, δ-values in ppm, internal standard tetramethylsilane).

| | |
|---|---|
| $C_3$—$CH_3$ | 1.47 |
| $CH_3$ (isoxazol) | 2.75 |
| $C_2$—H | 4.03 |
| $C_5$—H and $C_6$—H | 5.42; 5.48; 5.53 and 5.60 (quartet. $J_{1,n}\approx 4$ cps) |
| $C_6H_3$ | 7.63 |

Partial analysis of the IR spectrum (KBr disc, values in cm$^{-1}$)

| | |
|---|---|
| 3370 | NH |
| 1770 | C=O β-lactam |
| 1650 | C=O amide |
| 1600 | C=O carboxylate ion |

The same product in the same yield was obtained when tetrahydrofuran was used instead of ethyl acetate as solvent. This product was converted to the sodium salt by the same procedure.

EXAMPLE VIII

PREPARATION OF SODIUM 6-[3-(2,4,6-TRIMETHYLPHENYL)-5-METHYLISOXAZOL-4-YL-CARBONAMIDO]-PENICILLANATE ACID 8 ml of hexamethylphosphontriamide and 1.5 g (9.3 mmol) of 2,4,6-trimethylbenzonitrile oxide (TMBNO) were added to a solution of 2.54 g of 6-[(propyn-1-yl)carbonamido]-penicillanic acid (9.0 mmol) in 32 ml of ethyl acetate and the reaction mixture was heated to 60°C. After 2.5 hours, about half of the 1-propynylpenicillanic acid starting material had been consumed and some TMBNO was still present. After 3 hours, 0.7 g (4.3 mmol) of TMBNO were added and after 8 hours the reaction was more or less complete. After cooling the mixture to room temperature, 50 ml of iced water were added and the pH was adjusted to 7.5. The layers of the resulting mixture were then separated. The separated water layer was extracted 3 times with 100 ml of diethyl ether at pH 4.0. The combined extracts were washed with iced water, dried over anhydrous magnesium sulfate and treated once with norit. After the mixture had been concentrated to about one third of its original volume, 9 ml of a sodium 2-ethylhexanoate solution in ethyl acetate (conc. 1 mmol/ml) were added. The crystalline sodium salt so formed was collected by filtration, washed with diethyl ether and dried in vacuo to obtain 2.26 g (54% yield) of the desired product. The PMR and IR spectral data of the salt were consistant with the structure of the product named above.

Analysis of the PMR spectrum is DMSO (60 Mc, δ-values in ppm, tetramethylsilane as internal standard)

| | | |
|---|---|---|
| $C_3$—$CH_3$ | 1.33 and 1.43 | |
| Ortho—$CH_3$ | 2.03 | |
| para —$CH_3$ | 2.30 | |
| $CH_3$ (isoxazole) | 2.75 | |
| $C_2$—H | 3.87 | |
| $C_5$H and $C_6$H | 5.37→ 5.63 | (multiplet) |
| NH | 6.78 and 6.92 | (doublet, $J_{1,n}\approx 8$ cps) |
| $C_6H_2$ | 7.02 | |

Partial analysis of the IR spectrum (KBr disc, values in cm$^{-1}$)

| | |
|---|---|
| 3370 | NH |
| 1770 | C=O β-lactam |
| 1655 | C=O amide |
| 1605 | C=O carboxylate ion |

EXAMPLE IX

PREPARATION OF THE CYCLOHEXYLAMINE SALT OF 6-[(3-HYDROXY)PROPYN-1-YL-CARBONAMIDO]-PENICILLANIC ACID

Utilizing a procedure of Example I, the above mentioned hydroxypropynyl-carbonamido-penicillanic acid was prepared starting from 880 mg of magnesium, 2.4 ml of bromo ethane and 4.48 g (10% excess) of propargyltrimethylsilylether and 6.56 g of trimethylsilyl 6-isocyanato-penicillanate. After working up of the reaction mixture and adding cyclohexylamine to the obtained product, 7.2 g of the cyclohexylamine salt of the desired penicillanic acid were obtained.

In order to obtain an analytically pure substance, 2.9 g of the product were crystallized from an ethanol-diethyl ether mixture and the product was again crystallized in the same manner to obtain 1.0 g of pure material.

Elementary analysis ($C_{18}H_{27}N_3SO_4$):

| Calculated: | | Found: | |
|---|---|---|---|
| C: 54.41% | | C: 54.12 and 54.09% | |
| H: 6.86% | | H: 7.06 and 7.04% | |
| N: 10.60% | | N: 10.30 and 10.34% | |
| S: 8.06% | | S: 7.86 and 7.94% | |
| (O: 20.07%) | | (O: 20.66 and 20.57%) | |

Partial analysis of the IR spectrum of the final product (KBr disc, values in cm$^{-1}$)

| | |
|---|---|
| 3190 | NH and OH |
| 2230 | C≡C |
| 1795 | C=O β-lactam |
| 1680 | C=O amide |
| 1570 | C=O carboxylate ion |

Analysis of the PMR spectrum of the final product dissolved in hexadeuterodimethylsulfoxide (60 Mc, δ-values in ppm, internal reference 2,2-dimethylsilapentane-5-sulfonate)

| | | |
|---|---|---|
| $C_3$—$CH_3$ | 1.48 and 1.58 | (about 16 protons) |
| ($CH_2$)$_5$ cyclohexyl | about 0.8→ 2.2 | |
| N—CH cyclohexyl | about 2.7→ 3.2 | (about 1 proton) |
| $C_2$—H | 3.93 | (1 proton) |
| ≡ C—$CH_2$—O | 4.23 | (2 protons) |
| $C_5$—H and $C_6$—H | 5.37 | (slightly broadened singlet, 2 protons) |
| N—H, $NH_3$ and OH and possibly $H_2O$ | about 6.2 → 7.4 | (low broad absorption area, at least 5 protons) |

EXAMPLE X

PREPARATION OF 6-[3-(2,6-DICHLORO)PHENYL-5-HYDROXYMETHYL-ISOXAZOL-4-YL-CARBONAMIDO]-PENICILLANIC ACID

6-[hydroxypropyn-1-yl-carbonamido]-penicillanic acid (liberated from its cyclohexylamine salt) and 2,6-dichlorobenzonitrile oxide were dissolved in a mixture of ethyl acetate and hexamethylphosphontriamide. In order to achieve a virtually complete conversion, the solution was heated for 3 hours at 60°C. According to thin-layer chromatograms, practically only one cycloaddition product had been formed. This product was isolated by means of extractions and crystallization from acetone. The final product, obtained in good yield, appeared to be a complex or salt of 1 mole of 6-[3-(2,6-dichloro)phenyl-5-hydroxymethyl-isoxazol-4-yl-carbonamido]-penicillanic acid and 1 mol of hexamethylphosphontriamide (HMPA).

Elementary analysis of the said complex or salt (calculated for $C_{25}H_{35}Cl_2N_6O_7PS$):

| Calculated: | | Found: | |
|---|---|---|---|
| C: | 45.11% | C: | 45.53 and 45.39% |
| H: | 5.31% | H: | 5.57 and 5.49% |
| N: | 12.63% | N: | 12.33 and 12.42% |
| S: | 4.81% | S: | 4.92 and 4.82% |

Partial analysis of the IR spectrum of the final product (KBr disc, values in cm$^{-1}$)

| | |
|---|---|
| ±3390 | OH |
| 3262 | NH |
| 1790 | C=O β-lactam |
| 1712 | C=O carboxyl |
| 1669 | C=O amide |
| 1430 | isoxazole ring |
| 790 | C—Cl |

Analysis of the PMR spectrum of the final product dissolved in hexadeuterodimethylsulfoxide (60 Mc,δ-values in ppm, internal reference 2,2-dimethylsilapentane-5-sulfonate)

| | | |
|---|---|---|
| $C_a$—$CH_3$ | 1.52 and 1.60 | (6 protons) |
| O=P(N(CH$_3$)$_2$)$_3$ | 2.47 and 2.63 | ($J_{P-H}$≈9 cps, roughly 18 protons) |
| $C_2$—H | 4.32 | (1 proton) |
| C—CH$_2$—O | 4.92 | (slightly broadened singlet, 2 protons) |
| $C_3$—H and $C_6$—H | 5.47→5.72 | (sharp multiplet, $J_{1H}$≈4.1 cps, J≈7.3 cps, 2 protons) |
| $C_6H_3$ | 7.57 | (center of a narrow splitting pattern, 3 protons) |
| N—H | 8.95 and 9.05 | (doublet, J≈7.3 cps, 2 protons) |

EXAMPLE XI

PREPARATION OF SODIUM 6-[3-(2,4,6-TRIMETHYL)PHENYL-5-HYDROXYMETHYL-ISOXAZOL-4-YL-CARBONAMIDO]-PENICILLANATE

The reaction of Example X, was repeated except for the use of 2,4,6-trimethyl-phenyl-nitrile oxide. The conversion to virtually only one compound was again completed after 3 hours reaction at 60°C. The reaction mixture was treated according to the previously described manner and the desired penicillin was isolated as its sodium salt. The IR spectrum (KBr disc) showed carbonyl absorptions at 1780 (β-lactam), 1640 (amide) and 1595 cm$^{-1}$ (carboxylate ion). According to the PMR spectrum of the compound dissolved in hexadeuterodimethylsulfoxide, the salt was precipitated with approximately 1 mole of water.

Analysis of the PMR spectrum of a solution of the final product in a mixture of hexadeuterodimethylsulfoxide and D$_2$O (60 Mc,δ-values in ppm, internal reference 2,2-dimethyl-silapentane-5-sulfonate):

| | | |
|---|---|---|
| $C_a$—$CH_3$ | 1.37 and 1.43 | (6 protons) |
| ortho—$CH_3$ | 2.03 | (6 protons) |
| para—$CH_3$ | 2.30 | (3 protons) |
| $C_2$—H | 3.93 | (1 proton) |
| C—$CH_2$—O | 4.97 | (2 protons) |
| $C_3$—H and $C_6$—H | 5.35; 5.42; 5.50 and 5.57 | (AB quartet, $J_{1H}$≈4.0 cps, 2 protons) |
| $C_6H_2$ | 7.02 | (slightly broadened singlet, 2 protons) |

EXAMPLE XII

PREPARATION OF THE CYCLOHEXYLAMINE SALT OF 7-[(3-HYDROXY)PROPYN-1-YL-CARBONAMIDO]-DESACETOXYCEPHALOSPORANIC ACID

Using the procedure of Example I, the above mentioned hydroxypropynyl-carbonamido-desacetoxycephalosporanic acid was prepared starting from 880 mg of magnesium, 2.4 ml of bromoethane, 4.48 g (10% excess) of propargyl-trimethylsilylether (H—C≡C—CH$_2$—O—Si(CH$_3$)$_3$) and 6.5 g of trimethylsilyl 7-isocyanato-desacetoxycephalosporanate. After working up of the reaction mixture and adding cyclo-hexylamine to the obtained products, 6.0 g of the cyclohexylamine salt of the desired desacetoxycephalosporanic acid were obtained. The IR spectrum (KBr disc) showed carbonyl absorptions at 1760 (β-lactam), 1650 (amide) and 1575 cm$^{-1}$ (carboxylate ion) and a C≡C absorption at 2240 cm$^{-1}$.

Analysis of the PMR spectrum of the final product dissolved in hexadeuterodimethylsulfoxide (60 Mc,δ-values in ppm, internal reference 2,2-dimethylsilapentane-5-sulfonate):

| | | |
|---|---|---|
| (CH$_2$)$_5$ cyclohexyl | about 0.8→2.2 | |
| =C—CH$_3$ | 1.92 | |
| N—CH cyclohexyl | about 2.9 | (center of low broad absorption) (3 protons) |
| S—CH$_2$ | 2.95→3.65 | (gem.AB quartet, $J_{1H}$≈ 17 cps) |
| ≡C—CH$_2$—O | 4.25 | (practically a singlet, 2 protons) |
| $C_6$—H | 4.89 and 4.97 | (J≈4.7 cps, 1 proton) |
| $C_7$—H | 5.35; 5.43; 5.49 and 5.57 | (J≈4.7 cps, J'≈8.3 cps, 1 proton) |
| N—H | 8.52 and 8.66 | (relatively sharp doublet, J'≈8.3 cps) |
| NH$_3$, OH and possibly H$_2$O | about 6.6 | (center of a broad absorption, at least 4 protons) |

EXAMPLE XIII

PREPARATION OF SODIUM 7-[3-(2,6-DICHLORO)PHENYL-5-HYDROXYMETHYL-ISOXAZOL-4YL-CARBONAMIDO]-DESACETOXYCEPHALOSPORANATE

Using a procedure analogous to that described in Example VII, hydroxypropynyl-carbonamido-desacetoxycephalosporanic acid and 2,6-dichlorobenzonitrile oxide were dissolved in a mixture (4:1) of ethyl acetate and hexamethylphosphontriamide. Three hours heating at 60° was sufficient to achieve virtually complete conversion. The desired cephalosporin was isolated as its sodium salt. The IR spectrum of the final product (KBr disc) showed carbonyl absorptions at 1750 ($\beta$-lactam), 1670 (amide) and 1595 cm$^{-1}$ (carboxylate ion) and an absorption at 3390 cm$^{-1}$ (NH and OH).

Analysis of the PMR spectrum of a solution of the final product in a mixture of hexadeuterodimethylsulfoxide and D$_2$O (60 Mc, $\delta$-values in ppm, 2,2-dimethylsilapentane-5-sulfonate as internal reference):

| | | |
|---|---|---|
| =C—CH$_3$ | 1.96 | (3 protons) |
| S—CH$_2$ | 2.95 → 3.65 | (AB quarter, J≈17 cps, 2 protons) |
| C—CH$_2$—O | 4.93 | } (3 protons) |
| C$_6$—H | 4.90 and 4.98 | (doublet, J≈4.6 cps) |
| C$_7$—H | 5.52 and 5.60 | (doublet, J≈4.6 cps, 1 proton) |
| C$_6$H$_3$ | 7.56 | (center of a narrow splitting pattern, 3 protons) |

EXAMPLE XIV

PREPARATION OF THE CYCLOHEXYLAMINE SALT OF 6-[(3METHOXY)PROPYN-1-CARBONAMIDO]-PENICILLANIC ACID

The experiment was performed on a 10 mmol scale in the usual fashion. Ethyl magnesium bromide was prepared in situ, in tetrahydrofuran followed by the introduction of a suitable amount (as in Example I) of hexamethylphosphontriamide and of methyl propargyl ether (CH$_3$—O—CH$_2$—C≡CH). Subsequently, a solution of 10 mmol of trimethylsilyl 6-isocyanato-penicillanate in toluene was added to the in situ prepared 3-methoxypropynyl magnesium bromide. According to thin-layer chromatograms, a good conversion of the isocyanate to the methoxypropynyl penicillin had taken place. The reaction mixture was treated in the usual fashion resulting in an almost clean solution of the penicillin in ethyl acetate. The desired penicillanic acid was as usual, converted into 3.4 g (82% yield) its cyclohexylamine salt. The final, crystalline product was virtually pure according to thin-layer chromatograms and a PMR spectrum. The IR spectrum (KBr disc) showed among other absorptions bands at 2260 (C≡C), 1780 (C=O $\beta$-lactam), 1640 (C=O amide), 1580 (C=O carboxylate ion) and 1210 cm$^{-1}$ (C—O—C).

Analysis of the PMR spectrum of the final product dissolved in hexadeuterodimethylsulfoxide (60 Mc, $\delta$-values in ppm, 2,2-dimethyl-silapentane-5-sulfonate as internal reference):

| | | |
|---|---|---|
| C$_3$—CH$_3$ | 1.48 and 1.58 | } (about 16 protons) |
| (CH$_2$)$_5$ cyclohexyl | about 0.75 → 2.2 | |
| N—CH cyclohexyl | about 2.7 → 3.2 | (about 1 proton) |
| O—CH$_3$ | 3.33 | (3 protons) |
| C$_2$—H | 3.93 | (1 proton) |
| ≡C—CH$_2$—O | 4.28 | (2 protons) |
| C$_5$—H and C$_6$—H | 5.38 (center of an about 0.25 wide absorption) | } roughly 6 protons |
| NH,NH$_3$ + possibly H$_2$O | about 8.5 → 4.5 (low broad absorption area) | |

EXAMPLE XV

PREPARATION OF 6-[3-(2,4,6-TRIMETHYL)PHENYL-5-METHOXYMETHYL-ISOXAZOL-4-YL-CARBONAMIDO]-PENICILLANIC ACID

The cyclo-addition of methoxypropynyl-penicillin with 2,4,6-trimethyl-phenyl-nitrile oxide was performed in a solvent mixture of ethyl acetate and hexamethylphosphontriamide (4:1). The reaction time at 60°C was 8 hours. The IR spectrum (KBr disc) of the isolated product showed among other absorptions carbonyl absorptions at 1780 ($\beta$-lactam), 1740 (carboxyl) and 1670 cm$^{-1}$ (amide), an absorption at 3360 (OH and NH) and one at 1455 cm$^{-1}$ (isoxazole ring).

Analysis of the PMR spectrum of a solution of the isolated compound 6-[3-(2,4,6-trimethyl)phenyl-5-methoxymethyl isoxazol-4-yl-carbonamido]-penicillanic acid in a mixture of CDCl$_3$ and hexadeuterodimethylsulfoxide (60 Mc, $\delta$-values in ppm, tetramethylsilane as internal reference):

| | | |
|---|---|---|
| C$_3$—CH$_3$ | 1.43 and 1.50 | |
| ortho—CH$_3$ | 2.10 | |
| para—CH$_3$ | 2.32 | |
| O—CH$_3$ | 3.50 | |
| C$_2$—H | 4.20 | |
| C—CH$_2$—O | 4.97 | |
| C$_3$—H | 5.37 and 5.43 | } J$_{HH}$≈4 cps, 2 protons |
| C$_6$—H | 5.56; 5.63; 5.70 and 5.77 | |
| N—H | 6.6 and 6.75 | (doublet, J$_{NH-C_6H}$≈9 cps) |
| C$_6$H$_2$ | 7.0 | |

EXAMPLE XVI

PREPARATION OF SODIUM 6-[3-(2,6-DICHLORO)PHENYL-5METHOXYMETHYL-ISOXAZOL-4-YL-CARBONAMIDO]-PENICILLANATE

After 10 hours reaction at 60° with 2,6-dichloro-benzonitrile oxide as in Example VIII, methoxypropynylpenicillin was according to thin-layer chromatograms no longer present in the reaction mixture. The reaction mixture was treated in the usual fashion. The desired penicillin was isolated as the sodium salt. The IR spectrum of the final product showed among other absorptions carbonyl absorptions at 1775 ($\beta$-lactam) 1675 (amide) and 1605 cm$^{-1}$ (carboxylate ion), an isoxazole ring absorption at 1430 cm$^{-1}$ and a C-Cl absorption at 780 cm$^{-1}$. On account of its PMR spectrum and of thin-layer chromatograms, the purity of the compound sodium 6-[3-(2,6-dichloro) phenyl-5-methoxymethyl-isoxazol-4-yl-carbonamido]-penicillanate was estimated to be about 85–90%.

EXAMPLE XVII

PREPARATION OF 6-[(3-DIMETHYLAMINO)PROPYN-1-YL-CARBONAMIDO]-PENICILLANIC ACID

The in situ preparation of 3-dimethylamino-propynyl magnesium bromide as well as its conversion with trimethylsilyl 6-isocyanato-penicillanate was carried out in precisely the same manner as described before for other propynylpenicillins. However, the isolation procedure had to be changed considerably in view of the extremely good solubility of this zwitterionic penicillin in water.

Therefore, after it had been ascertained that the excellent conversion of the isocyanate into the new penicillin was completed, a small excess of trimethylchlorosilane was added to the reaction mixture at about −60°C followed by the addition of a slight excess of absolute ethanol thereby avoiding decomposition of silyl functions with water. A precipitate was the result of this operation and the precipitate was vacuum filtered, washed extensively with cold, dry diethyl ether and then dissolved in methanol. The solution was decolorized with active charcoal and subsequently poured into an excess volume of ethyl acetate. The precipitate formed was again dissolved in a minimal volume of methanol and again precipitated by adding the solution to ethyl acetate. This operation was repeated once more. The resulting product was dried in vacuo to constant weight. Thin-layer chromatograms showed virtually only one sulfur containing compound after treatment with an iodine-azide solution and a starch solution. This was affirmed by a PMR spectrum of the final product. However, the final product contained about 35% by weight of inorganic salts (presumably mainly MgBrCl), which could be estimated from a PMR spectrum of a solution of a weighed amount of the final product and a weighed amount of methyl benzoate. The IR spectrum (KBr disc) of the final product showed absorptions at 2270 (C≡C), 1775 (C=O β-lactam), 1650 (C=O carboxyl), 1680 (shoulder, C=O amide) and 1320 cm$^{-1}$ (C—N).

Analysis of the PMR spectrum of the final product dissolved in hexadeuterodimethylsulfoxide (60 Mc, δ-values in ppm, 2,2-dimethyl-silapentane-5-sulfonate as internal reference):

| | | |
|---|---|---|
| C$_3$—CH$_3$ | 1.48 and 1.62 | (6 protons) |
| N(CH$_3$)$_2$ | 2.37 | (singlet, 6 protons) |
| N—CH$_2$ | 3.62 | (somewhat broadened singlet, 2 protons) |
| C$_2$—H | 4.22 | (1 proton) |
| C$_5$—H and C$_6$—H | about 5.6 | (unsharp about 0.25 ppm wide splitting pattern, 2 protons) |
| N—H | about 9.6 | (distorted doublet, about 0.8 proton) |

EXAMPLE XVIII

PREPARATION OF 6-[3-(2,6-DICHLORO)PHENYL-5-DIMETHYLAMINO-ISOXAZOL-4-YL-CARBONAMIDOMETHYL]-PENICILLANIC ACID

In view of substantial magnesium salt impurities present in the crude starting penicillin of Example XVII, the cycloaddition with 2,6-dichlorobenzo nitrile oxide was performed with a calculated excess of impure penicillin. The solvent mixture was, as usual, ethyl acetate and HMPA (4:1) and the reaction temperature was 60°C. The conversion of dimethylaminopropynyl-penicillin was virtually complete after 5 hours. The normal isolation procedure was followed since the desired product could be removed from its solution in water by extraction at pH 5–6. The product obtained by evaporating the combined extracts was already reasonably pure since its main impurities were small amounts of diethyl ether and HMPA.

The proposed structure was confirmed by the IR spectrum (KBr pellet, absorptions at ± 3400 (NH), 1785 (C=O β-lactam, 1740 (C=O carboxyl), 1680 (C=O amide), 1440 (isoxazole ring), 1320 (C—N) and 780 cm$^{-1}$ (C-Cl)) and its somewhat remarkable PMR spectrum.

Analysis of the PMR spectrum of 6-[3-(2,6-dichloro)phenyl-5-dimethylamino-isoxazol-4-yl-carbonamidomethyl]-penicillanic acid dissolved in hexadeuterodimethylsulfoxide (60 Mc, δ-values in ppm, 2,2-dimethylsilapentane-5-sulfonate as internal reference):

| | | |
|---|---|---|
| C$_3$—CH$_3$ | ~1.66 and 1.52 ... major isomer | (6 protons) |
| | (~1.66) and 1.49 ... minor isomer | |
| N—CH$_2$ | ~3.71; ~3.98; ~4.05 and ~4.32 | (J$_{H,H'}$≈16.5 cps) (3 protons) |
| C$_2$—H | 4.27 (major isomer) and 4.29 (minor isomer) | |
| N(CH$_3$)$_2$ | 2.3 | (6 protons) |
| C$_5$—H and C$_6$—H | 5.4 → 5.7 | (unusually complicated multiplet, J$_{H}$≈4.0 cps, 2 protons) |
| C$_6$H$_3$ | about 7.6 | (3 protons) |
| N—H | ~11.15 | (distorted doublet, about 0.8 proton) |

Especially from the patterns of these group signals, it can be seen that the molecule exists in solution as a mixture of 2 isomers, present in about 5:3 ratio. The isomerism is probably caused by hindered rotation as consequence of a - presumably intramolecular - hydrogen bond, N—H . . . N(CH$_3$)$_2$, which comes to light in the relatively rather low field position of the N—H absorption.

EXAMPLE XIX

PREPARATION OF 6-[ETHOXY-ETHYNYL-CARBONAMIDO]-PENICILLANIC ACID

The above named, novel penicillin was prepared by using a procedure analogous to that used to prepare the other alkyn-1-yl-penicillin such as the procedure of Example I. Starting from 1.08 g of magnesium, 2.94 ml (39 mmol) of bromoethane, 3 g (42.9 mmol) of ethoxyacetylene (60% solution in hexane) and 8.0 g (25.5 mmols) of trimethylsilyl-6-isocyanato-penicillanate, the desired product was obtained according to IR and PMR spectra. It contained one-sixth mole of HMPA per mole of penicillin. Partial analysis of the IR spectrum of the final product (KBr disc, values in cm$^{-1}$):

| | |
|---|---|
| ≈3300 | NH |
| ≈2600 | OH acid |
| ≈2500 | |
| 2250 | C≡C |
| 1785 | C=O β-lactam |
| 1740 | C=O carboxylic acid |
| 1650 | C=O amide |

Analysis of the PMR spectrum of a solution of the final product in a mixture of CDCl$_3$ and a slight amount of hexadeuterodimethylsulfoxide (60 Mc, δ-values in ppm, tetramethylsilane as internal reference):

| | |
|---|---|
| Ethyl CH$_3$ | 1.46 (triplet, J=7.0 cps) ⎫ (9 protons) |
| C$_3$—CH$_3$ | 1.59 and 1.69 |
| O—CH$_2$ | 4.34 (quartet, J=7.0 cps) ⎭ |
| C$_2$—H | 4.40 ⎫ (3 protons) |
| C$_5$—H and C$_6$—H | about 5.45 → 5.80   multiplet, J$_{1H}$≈4.1 cps, 2 protons) |
| N—H | about 7.1 (broadened doublet, J$_{NH-C_6H}$≈9 cps) ⎫ (about 3 prot.) |
| COOH + some H$_2$O | about 6.8 (about 0.6 ppm wide absorption) ⎭ |
| O=P(N(CH$_3$)$_2$)$_3$ | 2.57 and 2.73 (J$_{P-H}$=9.2 cps, about 3 protons) |

EXAMPLE XX

PREPARATION OF 6-[3-(2,6-DICHLORO)PHENYL-5-ETHOXY-ISOXAZOL-4-YL-CARBONAMIDO]-PENICILLANIC ACID

This above named penicillin also was prepared by the usual cyclo-addition procedure and isolated straightforwardly as in Example I. Thin-layer chromatograms of the final product pointed at practically only one sulfur containing compound. Its proposed structure was confirmed by its IR and PMR spectra, revealing the presence of the impurities HMPA (about 8 mol %) and diethyl ether (about 20 mol %).

Analysis of the PMR spectrum of a solution of the said final product in hexadeuterodimethylsulfoxide (60 Mc, δ-values in ppm, 2,2-dimethyl-silapentane-5-sulfonate as internal reference):

| | |
|---|---|
| Ethyl CH$_3$ | 1.42, (1.54), and 1.66 (triplet, J=7.0 cps) ⎫ (9 protons) |
| C$_3$—CH$_3$ | 1.53 and 1.61 |
| C$_2$—H | 2.42 (1 proton) ⎭ |
| O—CH$_2$ | 4.83 (quartet, J=7.0 cps, 2 protons) |
| C$_5$—H and C$_6$—H | about 5.55 → 5.80 (multiplet, J$_{1H}$≈4.0 cps, 2 protons) |
| N—H | 7.25 (slightly broadened doublet, J$_{NH-C_6H}$≈ 8.5 cps about 0.8 proton) |
| C$_6$H$_3$ | 7.60 (almost a singlet, 3 protons) |

EXAMPLE XXI

PREPARATION OF SODIUM 7-[PROPYN-1-YL-CARBONAMIDO]-CEPHALOSPORANATE

Using the procedure of Example I, 300 mg of magnesium, 0.8 ml of bromoethane, gaseous propyne (as in Example I) and a freshly prepared solution of 6.6 mmols of trimethylsilyl 7-isocyanato-cephalosporanate in 13 ml of toluene were reacted to obtain 1.47 g of sodium 7-[propyn-1-yl-carbonamido]-cephalosporanate. In the isolation procedure, the cephalosporin was extracted from water at pH 3.0.

Partial analysis of the IR spectrum of the final product (KBr disc, values in cm$^{-1}$):

| | |
|---|---|
| ≈3400 | NH + possibly H$_2$O |
| ≈3270 | |
| 2240 | C≡C |
| 1760 | C=O β-lactam |
| 1730 | C=O acetoxy group |
| 1650 | C=O amide |
| 1605 | C=O carboxylate ion |
| 1230 | C—O—C |

Analysis of the PMR spectrum of a solution of the final product in hexadeuterodimethylsulfoxide (60 Mc,δ-values in ppm, 2,2-dimethyl-silapentane-5-sulfonate):

| | |
|---|---|
| ≡C—CH$_3$ | ⎫ 2.00 and 2.02 (6 protons) |
| CH$_3$—CO$_2$— | ⎭ |
| S—CH$_2$ | 3.05 → 3.70 (AB-quaret, J≈17.5 cps, 2 protons) ⎫ |
| O—CH$_2$ | 4.71; 4.91; 4.98 and 5.19 (J$_{1H-H}$≈ 12.2 cps) 3 protons |
| C$_6$—H | 4.93 and 5.01 (J$_{1H}$≈4.9 cps) ⎭ |
| C$_7$—H | 5.41; 5.49; 5.55 and 5.63 (J$_{1H}$≈4.8 cps, J'≈8 cps, 1 proton) |
| N—H | 9.36 and 9.50 (J'≈8 cps, about 0.8 proton) |

EXAMPLE XXII

PREPARATION OF SODIUM 7-[3-(2,6-DICHLORO)PHENYL-5-METHYL-ISOXAZOL-4-YL-CARBONAMIDO]-CEPHALOSPORANATE

The cyclo-addition between 2,6-dichloro-benzo nitrile oxide and propyn-1-yl-cephalosporin was carried out in the usual ethyl acetate/HMPA mixture using a procedure analogous to that described in Example VII. The desired product was isolated as the sodium salt. The proposed structure was confirmed by IR and PMR spectra of the final product.

Partial analysis of the IR spectrum of the final product (KBr disc, values in cm$^{-1}$):

| | |
|---|---|
| 3410 | NH |
| 1760 | C=O β-lactam |
| 1735 | C=O acetoxy group |
| 1672 | C=O amide |
| 1602 | C=O carboxylate ion |
| 1428 | isoxazole ring |
| 1230 | C—O—C |
| 876 | C—Cl |

Analysis of the PMR spectrum of the final product dissolved in hexadeuterodimethylsulfoxide (220 Mc,δ-values in ppm, 2,2-dimethyl-silapentane-5-sulfonate):

| | |
|---|---|
| CH$_3$—CO$_2$— | 2.01 (3 protons) |
| isoxazolyl C$_5$—CH$_3$ | 2.71 (3 protons) |
| S—CH$_2$ | 3.23; 3.31; 3.46 and 3.54 (J$_{1H-H}$≈17.5 cps, 2 protons) |
| O—CH$_2$ | 4.74; 4.79; 4.97 and 5.02 ⎫ (J$_{1H-H}$≈11.5 cps) ⎬ (3 prot.) |
| C$_6$—H | (4.97) and 4.99 (J$_{1H}$≈4.6 cps) ⎭ |
| C$_7$—H | 5.56; 5.58; 5.60 and 5.62 (J$_{1H}$≈4.6 cps, J'≈8.6 cps, 1 proton) |
| N—H | 9.10 and 9.14 (J'≈8.6 cps, about 0.9 proton) |
| C$_6$H$_3$— | 7.58 (center of narrow splitting pattern, 3 protons) |

EXAMPLE XXIII

PREPARATION OF 6-[PROPYN-1YL-CARBONAMIDO]-PENICILLANIC ACID SACCHARIMIDE

Utilizing the procedure of Example I, 1-propynyl magnesium bromide was prepared starting from 220 mg of magnesium, 0.6 ml of bromoethane and gaseous propyne. Subsequently, a concentrated solution of 2.035 g (5 mmols) of 6-isocyanato-penicillanic acid saccharimide in dry tetrahydrofuran was added dropwise to the solution of the Grignard reagent in tetrahydrofuran/HMPA mixture (4:1). The reaction temperature was −55°C. The reaction mixture was slowly poured into an icycold mixture of much water and ethyl acetate. By simultaneous and gradual addition of dilute hydrochloric acid, the pH of the well stirred mixture was continuously kept slightly below 7. The ethyl acetate layer was separated and repeatedly shaken with cold, neutral water. The purified extract was dried on anhydrous magnesium sulfate, filtered and concentrated in vacuo to small volume causing the deposition of a solid. The solid was vacuum filtered and washed with cold diethyl ether. The resulting, slightly colored product was dried in vacuo to obtain 1.5 g of the above named product. The structure proposed was confirmed by its IR and PMR spectra. According to thin-layer chromatograms, the final product contained virtually only one sulfur positive compound. According to the PMR spectra, the final product contained about one-third mol of HMPA and one-third mol of diethyl ether per mol of penicillin.

Partial analysis of the IR spectrum of the final product (KBr disc, values in cm⁻¹):

| | | | |
|---|---|---|---|
| ±3380 | NH | 1660 | C=O amide (CONH) |
| 2250 | C≡C | 1365 } 1200 } | SO₂ |
| 1775 1750 } 1720 } | C=O β-lactam CONCO | 750 | aromatic substitution pattern |

Analysis of the PMR spectrum of a solution of the final product in a mixture of CDCl₃ and a small amount of hexadeuterodimethylsulfoxide (60 Mc,δ-values in ppm, internal reference tetramethylsilane):

| | |
|---|---|
| CH₃—ether | 1.2 (triplet, about 1 proton) |
| C₃—CH₃ | 1.59 and 1.76 (6 protons) |
| ≡C—CH₃ | 2.00 (3 protons) |
| O=P(N(CH₃)₂)₃ | 2.59 and 2.73 (about 6 protons) |
| O—CH₂ ether | 3.5 (quartet, about ⅔ proton) |
| C₂—H | 5.9 (singlet) |
| C₃—H and C₆—H | about 5.5 → 5.8, multiplet, $J_{AB}≈4$ cps) } (3 protons) |
| N—H | about 6.6 (about 0.8 proton) |
| C₆H₃ | about 8.05 (center of an about 0.5 ppm wide splitting pattern, 4 protons) |

EXAMPLE XXIV

PREPARATION OF 6-[3-(2-CHLORO-6-FLUORO)PHENYL-5-METHYL-ISOXAZOL-4-YL-CARBONAMIDO]-PENICILLANIC ACID

To a solution of 5 mmol of 6-[propyn-1-yl-carbonamido]-penicillanic acid in a mixture of 20 ml of ethyl acetate and 5 ml of hexamethylphosphontriamide (HMPA) 2mmol of 2-chloro-6-fluoro-benzonitrile oxide were added. The solution was heated at 60°C for 2.5 hours. A second portion of 2mmol of the nitrile oxide was added and the solution again was heated for 2.5 hours at 60°C. The sequence was repeated with a third portion of 2 mmol of the nitrile oxide. Thin-layer chromatograms after 7.5 hours of reaction indicated the presence in the reaction mixture of some nitrile oxide, its corresponding furoxane and about a (2:1) ratio of the desired penicillin ("Flucloxacillin") and propynyl-penicillin. Other penicillanic acid derivatives or degradation products were hardly discernable at all. The reaction was stopped and the mixture poured out into 50 ml of iced water to which 30 ml of ethyl acetate were added. The pH of the mixture was adjusted to 8.2 and the layers were separated and the organic layer discarded. Extractions with four (50 ml) portions of ethyl acetate at pH 7.0, 6.0, 5.5 and 5.0 removed the desired penicillin from the water-layer without coextraction of the starting product. The extracts of pH 6.0, 5.5 and 5.0, together containing the greater part of the formed Flucloxacillin were united, dried over anhydrous magnesium sulfate, filtered and completely evaporated in vacuo. The obtained semi-solid residue was dissolved in an excess of dry diethyl ether. This solution was concentrated to about 5 ml. After the appearance of slightly yellow crystals, the flask with its contents was slowly cooled down to −60°C. 5 ml of very cold dry diethyl ether were added with shaking and the contents of the flask were quickly poured on to a glass filter. The supernatuant liquid was sucked through the filter and the crystals were washed with 10 ml of very cold ether. The final product proved to be 1.4 g (40% yield) of a practically pure 1:1 complex of Flucloxacillin and HMPA.

Partial analysis of the IR spectrum of the final product (KBr disc, values in cm⁻¹):

| | |
|---|---|
| 3400 } ±2400 } ±1930 | OH |
| 3200 | NH |
| 1792 | C=O β-lactam (intensive) |
| 1675 1715 } shoulders 1695 } | C=O amide and C=O carboxyl (very intensive) |
| 1600 | C=C aromatic |
| 1550 | N—H def. possibly |
| 1420 | isoxazole ring |
| 1460 1302 1210 | relatively weak } intensive } intensive } absorptions of HMPA |

—Continued

| 1075 | relatively weak |
| --- | --- |
| 982 | intensive or 1000 intensive |
| 1000 | intensive or 982 intensive   C—F presumably |
| 802 | C—Cl and/or aromatic substitution pattern |

Analysis of the PMR spectrum of a solution of the final product in hexadeuterodimethylsulfoxide (220 Mc, δ-values in ppm, 2,2-dimethyl-silapentane-5-sulfonate as internal reference):

| | |
| --- | --- |
| $C_3$—$CH_3$ | 1.48 and 1.59 (singlets, 6 protons) |
| O=P(N($CH_3$)$_2$)$_3$ | 2.54 (doublet, $J_{P-H}$=9.5 cps, about 9 protons) |
| isoxazole $C_5$—$CH_3$ | 3.71 (singlet, 3 protons) |
| $C_2$—H | 4.26 (singlet, 1 proton) |
| $C_5$—H | about 5.46 (doublet $J_{1H}$≈4.0 cps, 1 proton) |
| $C_6$—H | about 5.50 (quartet, $J_{1H}$≈4.0 cps, J'≈7.4 cps, 1 proton) |
| $C_6H_5$ | 7.53 → 7.66 (asymmetric multiplet, 3 protons) |
| N—H | 8.93 (doublet, J'≈7.4 cps, about 1 proton) |

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the preparation of penicillins of the formula

wherein Q is a penicillanic acid group of the formula

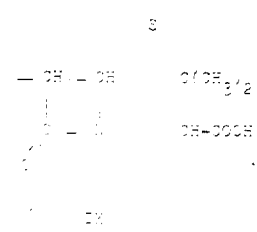

wherein $R_4$ is selected from the group consisting of hydrogen, lower alkyl optionally substituted, phenyl optionally substituted, lower alkoxy, benzyl optionally substituted on the phenyl ring, cycloalkyl of 5 to 8 carbon atoms optionally substituted and carboxy and esterified carboxy, said optional substituents being selected from the group consisting of hydroxy, lower alkoxy, carboxy, alkoxycarbonyl, halogen and diloweralkylamino and $R_5$ is phenyl optionally carrying at least one substituent selected from the group consisting of lower alkyl, lower alkoxy, di(lower)alkylamino, nitro and halogen, or $R_5$ is a tertiary lower alkyl or adamantyl, which comprises reacting a compound of the formula

wherein U is selected from the group consisting of hydroxy, imido and OE in which E is selected from the group consisting of a silyl, benzyl, benzhydryl, 2,2,2-trichloroethyl and optionally halosubstituted phenacyl with a nitrile oxide of the formula

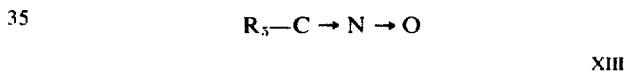

wherein $R_5$ has the above definition in the presence of at least one aprotic dipolar organic solvent and optional amounts of hexamethylphosphontriamide to form the corresponding isoxazole and converting the group U in the resulting product into a hydroxy group in the resulting product.

2. The process of claim 1, in which the aprotic dipolar organic solvent is selected from the group consisting of tetrahydrofuran, ethyl acetate and dioxane.

3. The process of claim 1, in which up to 40 vol. percent of hexamethylphosphontriamide is added to the solvent medium.

4. The process of claim 1, in which at least one molar equivalent of nitrile oxide is used.

5. The process of claim 1, in which the cyclo-addition reaction is carried out at a temperature of between 0° to 80°C.

* * * * *

UNITED STATES PATENT OFFICE
CERTIFICATE OF CORRECTION

Patent No. 3,891,628            Dated    June 24, 1975

Inventor(s)  PETER MAX SMID and JAN KALTER

It is certified that error appears in the above-identified patent and that said Letters Patent are hereby corrected as shown below:

| Col. | Line | Page | Line | |
|---|---|---|---|---|
| 3 | 65 | 5 | 9 | "$R_4$" should be --$R_4$,-- |
| 4 | 1 | 5 | 12 | "$R_5-C-N\equiv O\rightarrow$" should be --$R_5-C\equiv N \rightarrow O$-- |
| 14 | 66 | 25 | 8 | "bromethane" should be --bromoethane-- |
| 15 | 5 | 25 | 14 | "porduct" should be --product-- |
| 22 | 55 | 38 | 2 | "5Methoxymethyl" should be --5-Methoxymethyl-- |

UNITED STATES PATENT OFFICE
CERTIFICATE OF CORRECTION

Patent No. 3,891,628                     Dated   June 24, 1975

Inventor(s)  PETER MAX SMID and JAN KALTER

It is certified that error appears in the above-identified patent and that said Letters Patent are hereby corrected as shown below:

| Col. | Line | Page | Line | | |
|---|---|---|---|---|---|
| 24 | 35 | 40&41 | 25,26 & 27 | $C_2$-H | 4.27 (major isomer) and 4.29 (minor isomer) |

(Cont'd) from page 1

$C_5$-H and $C_6$-H

N-H    ~11.15" should be

--§$C_3$-$CH_3$   ⩗1.66 and 1.52

(⩗1.66 and 1.49)

§ N-$CH_2$   ⩗3.71; ⩗3.98; ⩗4.05 ⩗and 4.32

§ $C_5$-H and $C_6$-H

N-H    ⩗11.15 --

UNITED STATES PATENT OFFICE
CERTIFICATE OF CORRECTION

Patent No. 3,891,628　　　　　　　Dated June 24, 1975

Inventor(s) Peter Max Smid and Jan Kalter　　　Page 3 of 3

It is certified that error appears in the above-identified patent and that said Letters Patent are hereby corrected as shown below:

The formulas in Claim 1 should read as shown below:

Column 29, lines 35-41:

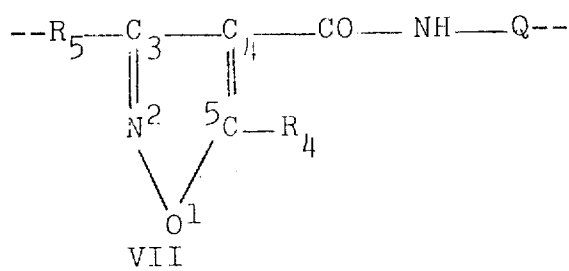

Column 29, lines 44-52:

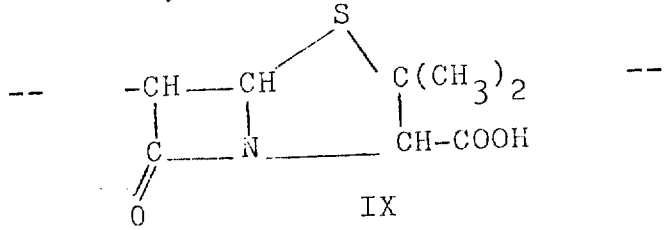

Column 30, lines 21-26:

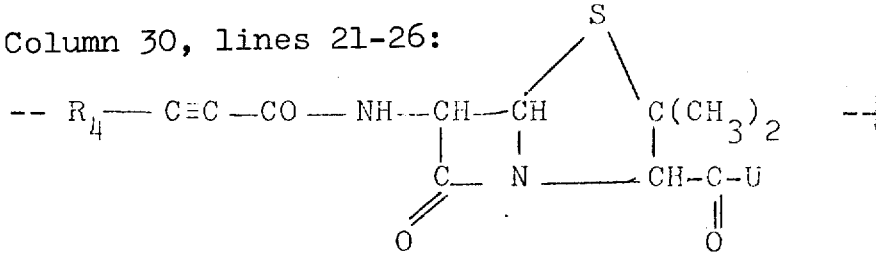

Signed and Sealed this sixth Day of April 1976

[SEAL]

Attest:

RUTH C. MASON
Attesting Officer

C. MARSHALL DANN
Commissioner of Patents and Trademarks